United States Patent
Pila Gonzalez et al.

(10) Patent No.: US 9,310,235 B2
(45) Date of Patent: Apr. 12, 2016

(54) DOUBLE ISOLATION FOR DOUBLE CHAMBER DIFFERENTIAL PRESSURE METER

(75) Inventors: Jose Antonio Pila Gonzalez, Cantabria (ES); Fernando Velar Fernandez, Cantabria (ES); Ignacio Cobo Ocejo, Cantabria (ES); Simon Peter Blackmore, Norfolk (GB); James Edward Arthur Harrod, Norfolk (GB)

(73) Assignee: FUNDACION LEADING INNOVA, San Felices de Buelna (Cantabria) (ES)

( * ) Notice: Subject to any disclaimer, the term of this patent is extended or adjusted under 35 U.S.C. 154(b) by 0 days.

(21) Appl. No.: 13/822,157

(22) PCT Filed: Mar. 9, 2011

(86) PCT No.: PCT/ES2011/000066
§ 371 (c)(1),
(2), (4) Date: Mar. 11, 2013

(87) PCT Pub. No.: WO2012/120158
PCT Pub. Date: Sep. 13, 2012

(65) Prior Publication Data
US 2013/0180614 A1    Jul. 18, 2013

(51) Int. Cl.
*G01F 1/42* (2006.01)
*G01F 1/40* (2006.01)
*F16K 3/02* (2006.01)

(52) U.S. Cl.
CPC ............... *G01F 1/40* (2013.01); *F16K 3/0272* (2013.01); *G01F 1/42* (2013.01)

(58) Field of Classification Search
CPC ............... G01F 1/40; G01F 1/36; G01F 1/42; G01F 1/38; F16K 3/00; F16K 3/0272

USPC ............... 138/44, 94; 251/326, 327, 328, 367
See application file for complete search history.

(56) References Cited

U.S. PATENT DOCUMENTS 1,938,460 A   12/1933   Muff et al.
1,996,192 A   4/1935    Daniel
(Continued)

FOREIGN PATENT DOCUMENTS

CN   201083275 Y   7/2008
DE   3227697 A1    2/1984
(Continued)

OTHER PUBLICATIONS

Extended ESR from corresponding European Application 11860150.9-1553 dated Jul. 24, 2014.
(Continued)

*Primary Examiner* — J. Casimer Jacyna
*Assistant Examiner* — Benjamin R Shaw
(74) *Attorney, Agent, or Firm* — Lucas & Mercanti, LLP

(57) ABSTRACT

Double isolation for double chamber differential pressure meter, where the differential pressure meter comprising an axial conduit in which there is arranged a plate provided with an orifice which can be extracted into an accessory chamber which communicates with the axial conduit through a passage, there being arranged in relation to said passage a closure formed by two closure elements which can move independently between a position in which they do not interfere with the aforementioned passage and a position in which they interrupt it such that said closure elements allow establishing a leak-tight closure between the axial conduit and the accessory chamber to extract the plate without interrupting the flow of gas or fluid through the axial conduit.

4 Claims, 7 Drawing Sheets

(56) References Cited

U.S. PATENT DOCUMENTS

| | | | |
|---|---|---|---|
| 2,050,544 A * | 8/1936 | Robinson et al. | 138/44 |
| 3,194,259 A | 7/1965 | Garrod | |
| 3,817,287 A * | 6/1974 | Aitken | 138/94 |
| 4,007,906 A * | 2/1977 | Karpenko | 251/26 |
| 4,275,763 A | 6/1981 | Fahrig | |
| 4,425,806 A | 1/1984 | Van Scoy | |
| 5,186,474 A * | 2/1993 | Jacobs | 277/637 |
| 5,464,036 A * | 11/1995 | Tomkins et al. | 137/315.42 |
| 5,474,103 A * | 12/1995 | Klak | 137/315.27 |
| 5,778,933 A | 7/1998 | Crane | |
| 5,836,356 A * | 11/1998 | Desai | 138/44 |
| 5,967,166 A * | 10/1999 | Carter | 137/1 |
| 6,871,666 B1 * | 3/2005 | Loga et al. | 137/601.18 |
| 7,063,107 B2 * | 6/2006 | Loga | 138/44 |
| 7,104,521 B2 * | 9/2006 | Loga | 251/207 |
| 2004/0016463 A1 * | 1/2004 | Shillito et al. | 137/599.17 |
| 2005/0258389 A1 * | 11/2005 | Loga | 251/326 |
| 2007/0186987 A1 * | 8/2007 | Loga et al. | 138/44 |
| 2009/0194182 A1 * | 8/2009 | Loga | 138/44 |
| 2010/0229988 A1 * | 9/2010 | Loga et al. | 138/44 |

FOREIGN PATENT DOCUMENTS

| | | |
|---|---|---|
| EP | 0092910 A1 | 11/1983 |
| ES | 282051 U | 4/1985 |
| FR | 2138265 A1 | 1/1973 |
| WO | 2014124514 A1 | 8/2014 |

OTHER PUBLICATIONS

Request for Re-Examination from corresponding Canadian Patent 2,810,121.

Third party observation filed in EPO for corresponding European Application 11860150.9.

* cited by examiner

DOUBLE ISOLATION FOR DOUBLE CHAMBER DIFFERENTIAL PRESSURE METER

CROSS-REFERENCE TO RELATED APPLICATION

This application is a 371 of PCT/ES2011/000066 filed Mar. 9, 2011, the priority of which application is hereby claimed and incorporated by reference herein.

FIELD OF THE ART

The present invention relates to measuring the flow of fluids (gas or liquid) in pipes, and particularly to flow measuring apparatus having a plate provided, with an orifice having at smaller section than the flow circulation pipe and comprising a dual chamber for removing the plate with an orifice without interrupting the flow circulation, proposing a closure system which allows establishing a completely leak-tight isolation between the two chambers of the device when the plate with an orifice is removed.

STATE OF THE ART

To measure the flow of fluids circulating through pipes, flow meter devices which are intercalated in the pipe of application are known, there being several functional implementations of said devices.

A conventional solution of the aforementioned flow meter devices includes a plate provided with an orifice having a smaller section than the fluid circulation pipe in which the flow meter device is incorporated, said orifice being concentric with the section of the pipe of application in the functional arrangement, such that the flow of the gas or fluid circulating through the pipe increases in speed as it passes through that orifice, the increase in speed creating a pressure differential that can be measured to calculate the volumetric flow of fluid according to the section of the pipe.

In this functional arrangement the sharp edge of the orifice bore of the plate of these flow meter devices experiences wear due to the friction of the circulating gas or fluid, such that the plate with an orifice must be frequently removed for inspection, or replacement. Failure to replace or repair a plate exhibiting a worn sharp edge of the orifice manifests as increased percentage uncertainty in volumetric flow as is referenced within the standards ISO 5167-2:2003 section 5.1.7.2 and API 14-Section 3-Part 2.4.2.

In some cases, however, the interruption of the fluid circulation through the pipes in which the flow is measured can be damaging, so meter devices provided with a dual chamber have been developed in which the plate provided with the orifice can be removed from the normal functional position in the device, into an accessory chamber provided with a closure which allows isolating it with respect to the main chamber in which said plate with an orifice is located in the normal functional position, the embodiments contemplated in patents U.S. Pat. No. 1,936,192, US 2005/0258389 and US 2007/0185387, for example, corresponding with this solution.

The known solutions of such flow meter devices having a plate with an orifice and having a dual chamber to allow the removal of the plate with en orifice without interrupting the flow of the fluid through the pipe of application include a simple closure between the main chamber and the accessory chamber, whereby complete isolation leak-tightness between the chambers of the meter device is not assured, therefore these devices are not suitable for using in high-pressure fluid conduits, or for environments that demand a second method by which isolation can achieved, supported by visual evidence that such isolation has been both achieved and sustained.

OBJECT OF THE INVENTION

According to the invention, a closure system for establishing the isolation between the dual chamber of flow meters having a plate with an orifice susceptible to being extracted without interrupting gas or fluid circulation passing through, which allows determining a completely leak-tight isolation with a visible means of between the two chambers when the plate with an orifice is extracted, is proposed.

The objective of the invention is determined with two independent closure elements which are arranged in respective superimposed positions between the two chambers of the corresponding flow meter, said closure elements having respective operating controls which allow the individual movement thereof from the outside between respective open end closed positions of each of them.

The two independent closure elements consist of angular plate valves which are arranged in a sliding assembly in corresponding housings, with the possibility of movement between a sealed position for sealing the passage between the two chambers of the flow meter and an offset position with respect to said passage.

A closure system is thus obtained which, when the plate with an orifice of the flow meter is removed, from the main chamber where it is normally located in the functional position into the accessory extraction chamber, by means of moving one of the closure elements to the closed position, a seal is established in the passage between the two chambers, while the movement of the other closure element to the closed position assures complete leak-tightness of the seal, completely preventing the possibility of leaks between the two chambers, such that the flow meter is applicable for high-pressure fluid conduits, with the possibility of extracting and incorporating the plate with an orifice in a completely secure manner without having to interrupt the flow of the fluid since the dual closure system completely prevents leaks. This solution also satisfies the requirement of providing double isolation for health and safety purposes.

The closure system of the invention therefore has very advantageous features for the functional capacity of the flow meters for which it is intended, its application in said flow meters acquiring its own identity and preferred character.

DETAILED DESCRIPTION OF THE INVENTION

The object oil the invention relates to a closure system for flow meters comprising a body (1) longitudinally provided with an axial conduit (2) corresponding in diameter with a fluid (gas or liquid) circulation pipe the flow of which is to be measured, a plate (3) provided with an orifice (4) having a smaller section than the axial conduit (2) being transversely incorporated in the axial conduit (2).

These flow meters are intercalated in the fluid circulation pipe the flow of which is to be measured, such that when the fluid passes through the orifice (4) of the plate (3) the flow increases in speed, giving rise to a pressure differential the measurement of which allows determining the volumetric flow of the fluid.

Figure 3:
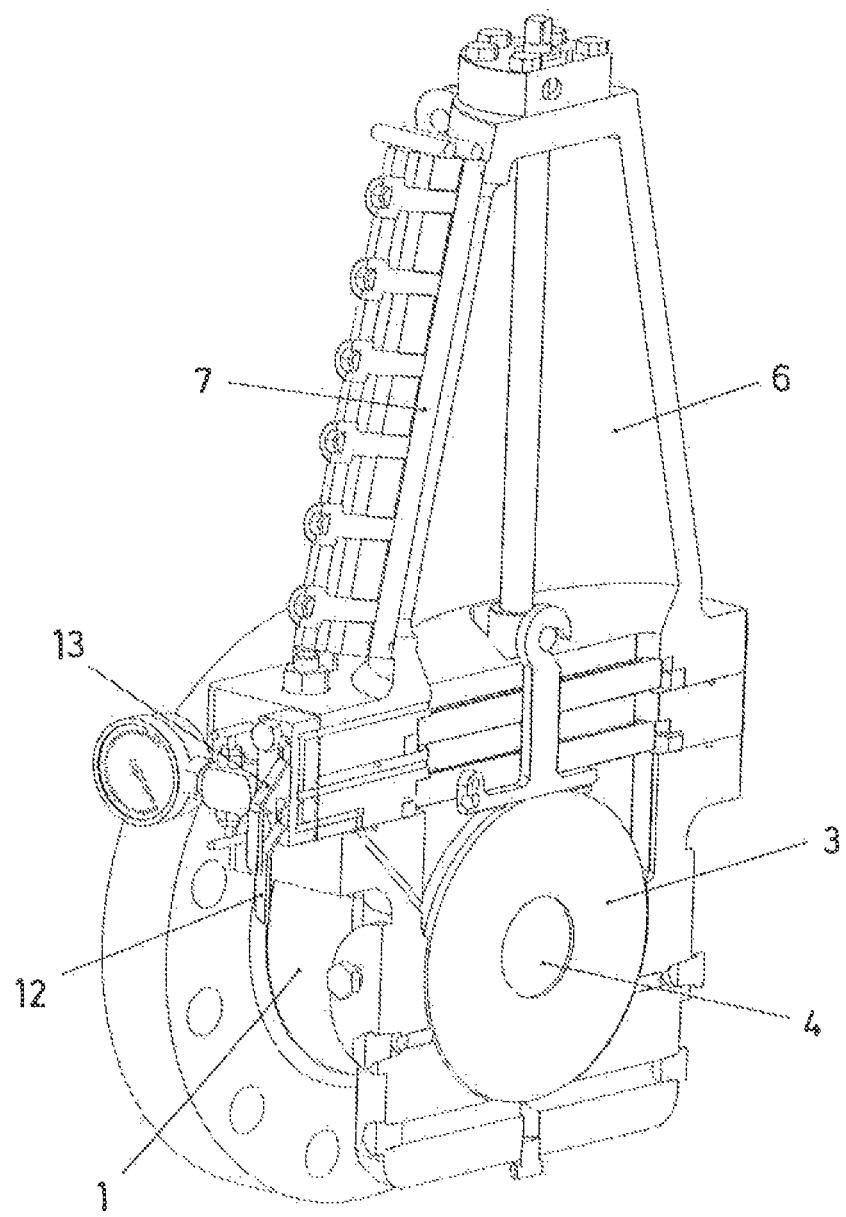
FIG. 3 shows a vertical cross-section perspective view of the flow meter with the plate with an orifice located in the normal functional position in the main chamber.
Figure 4:
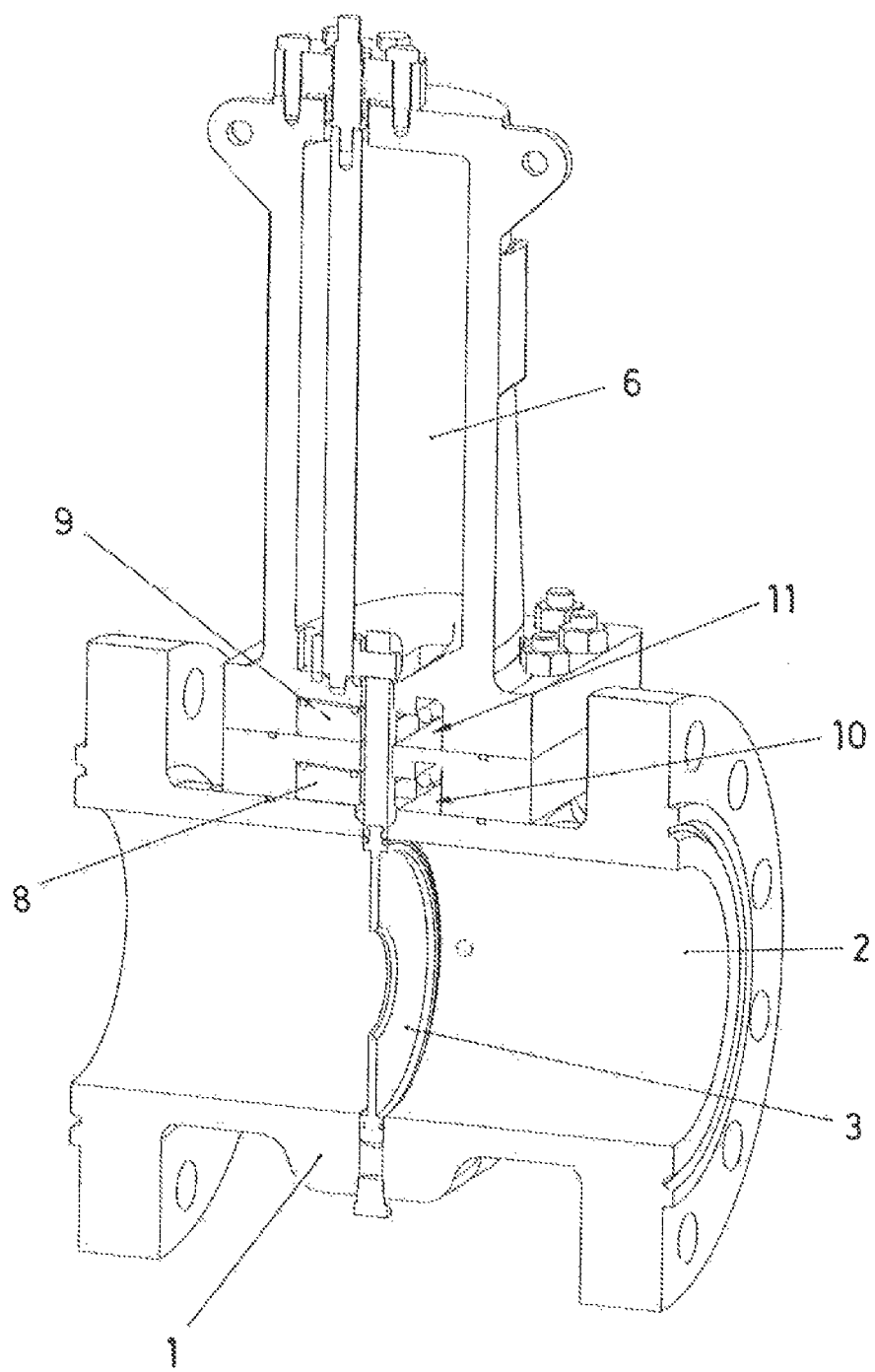
FIG. 4 shows a vertical longitudinal-section perspective view of the flow meter with the plate with an orifice located in the normal functional position in the main chamber, the closure elements of the passage between the main chamber and the accessory chamber being observed in the open position.

The axial conduit (2) determines a main chamber in the flow meter in which the plate (3) provided with the orifice (4) is arranged in the normal functional position, as can be seen in FIGS. 3 and 4, said main chamber being communicated through a passage (5) with an accessory chamber (6), which is closed by a cover (7) that can be removed to leave it open to the outside.

Figure 5:
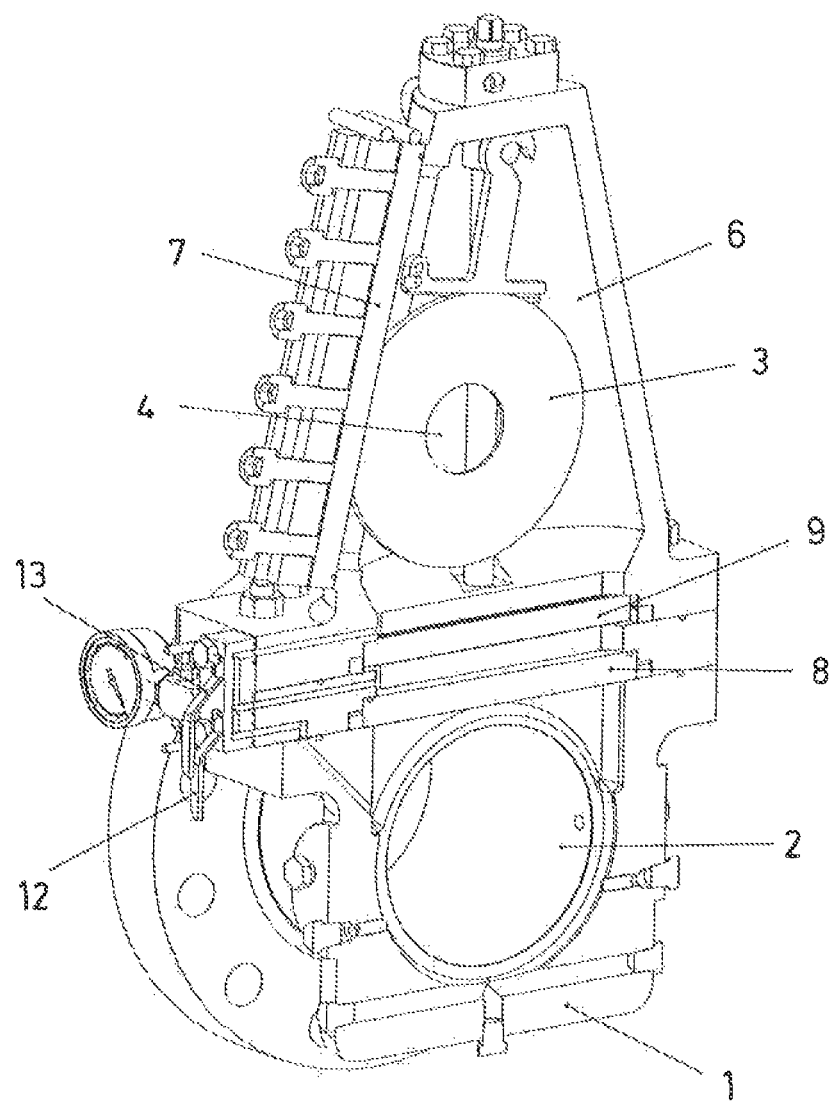
FIG. 5 shows a vertical cross-section of the flow meter with the plate with an orifice extracted into the accessory chamber.
Figure 6:
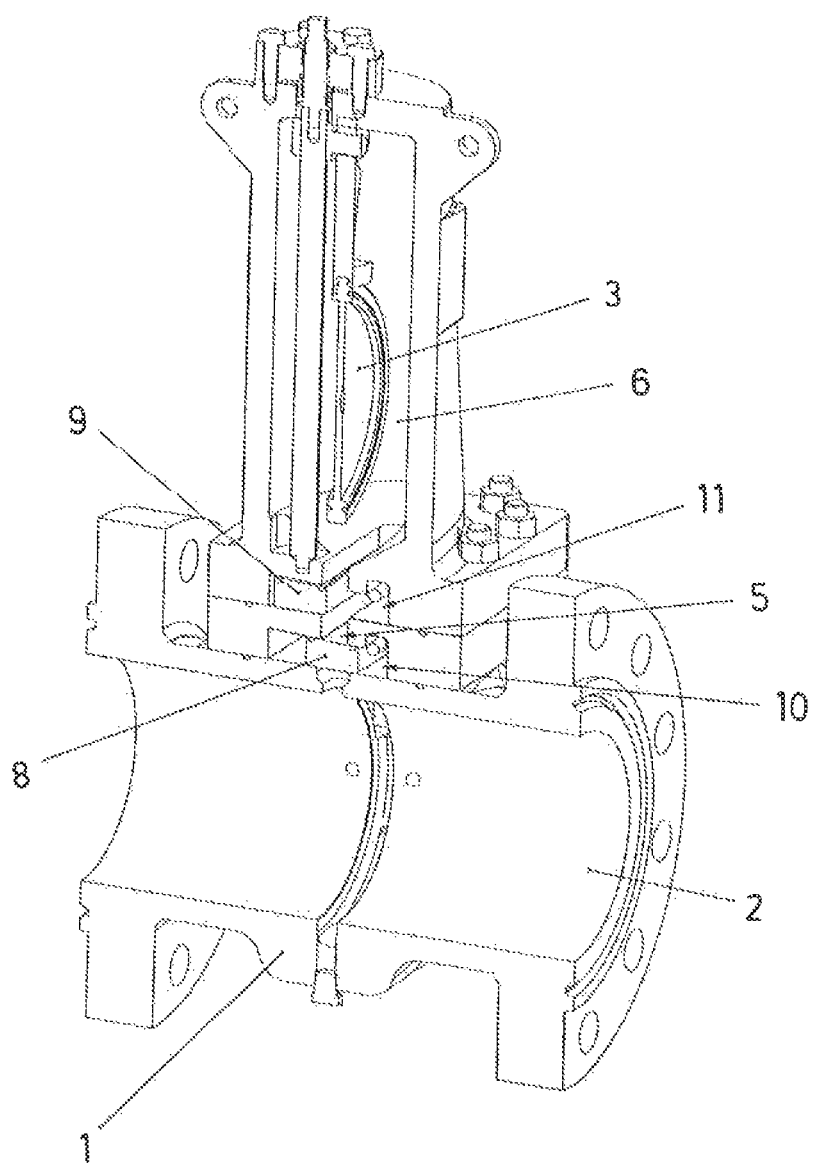
FIG. 6 shows a vertical longitudinal-section perspective view of the flow meter with the plate with an orifice extracted into the accessory chamber and the passage between the main chamber and the accessory chamber sealed by an element of the closure system, the other element of the closure system being in the open position.
Figure 7:
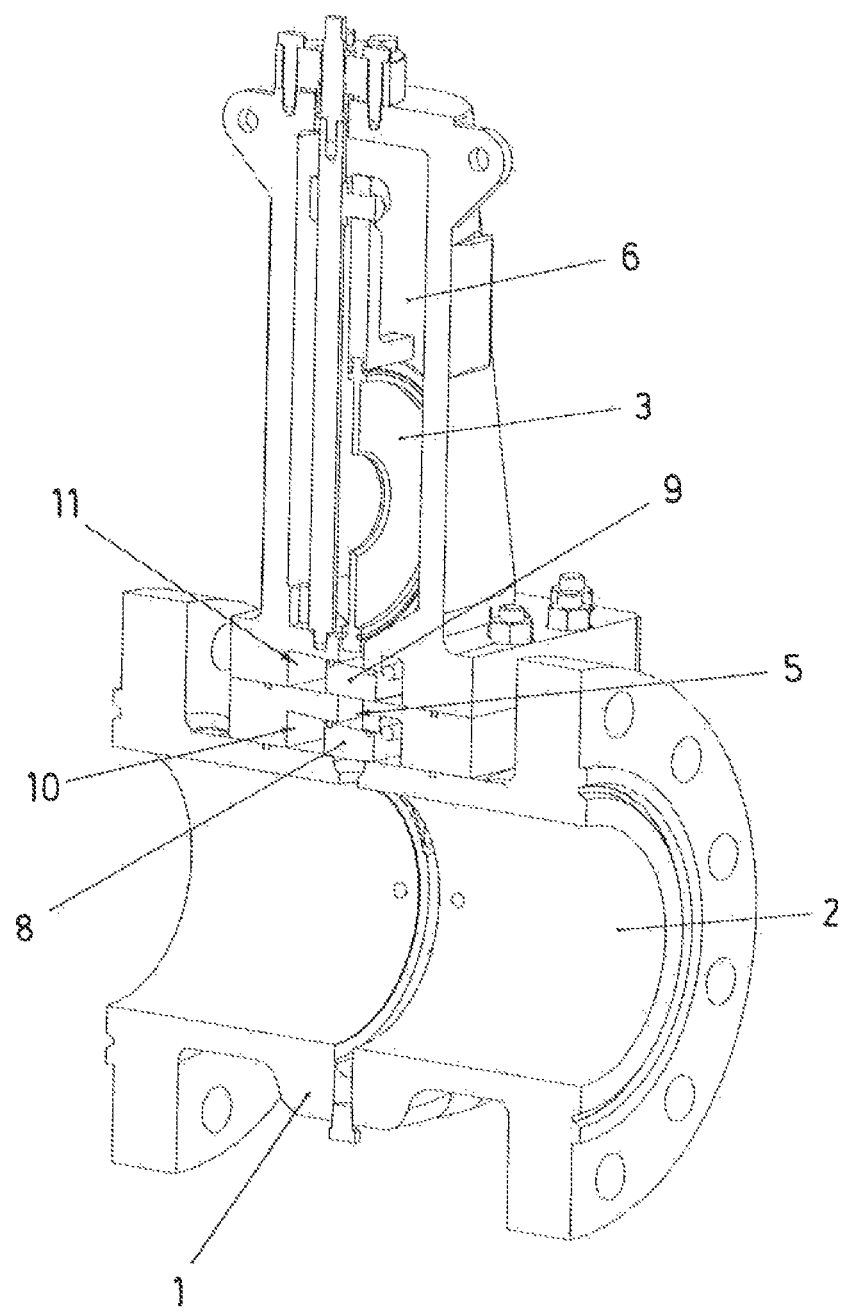
FIG. 7 shows a vertical longitudinal-section perspective view of the flow meter with the plate with an orifice extracted into the accessory chamber and the passage between the main chamber and the accessory chamber sealed by the two elements of the closure system.

With respect to the passage (5) communicating the main chamber defined by the axial conduit (2) with the accessory chamber (65, a practicable sealing closure is arranged between an open position and a closed position, such that when it is necessary to extract the plate (3) in order to inspect or replace it due to the wear of the orifice (4) by friction of the fluid passing there through in the flow meter application function, said plate (3) can be extracted from the main chamber defined by the axial conduit (2) to the accessory chamber (6), as shown in FIG. 5.

Figure 1:
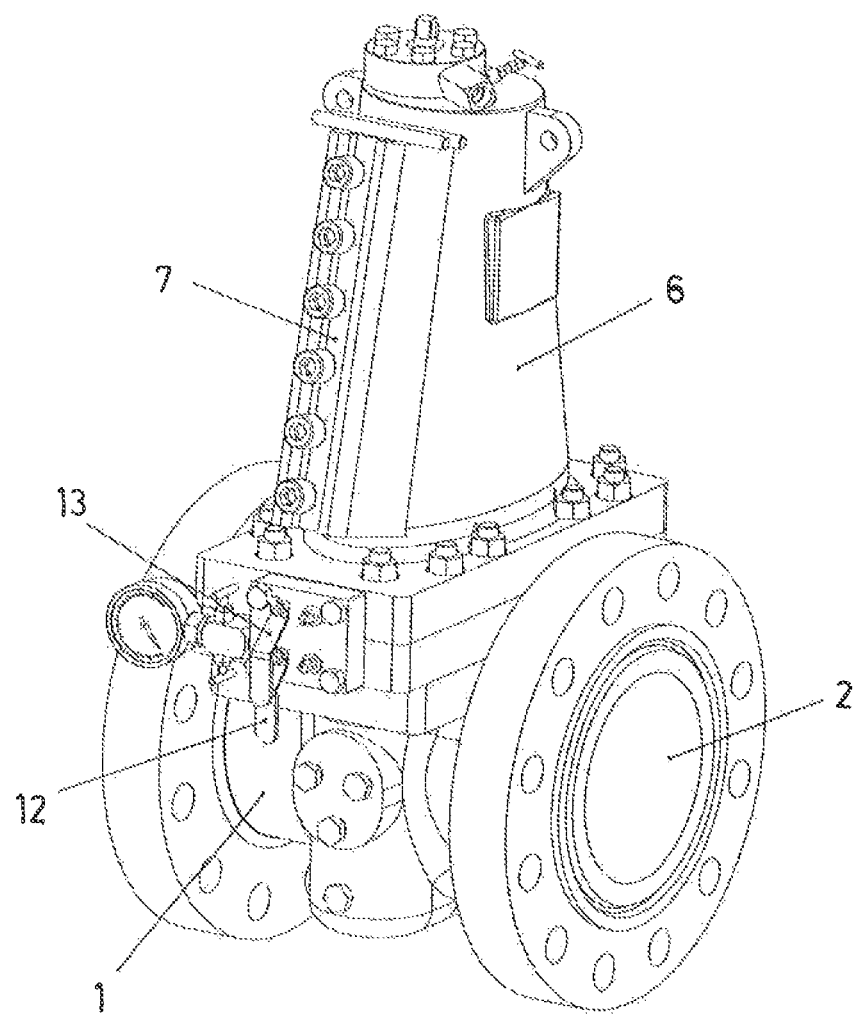
FIG. 1 shows an outer perspective view of a flow meter provided with the closure system object of the invention.
Figure 2:
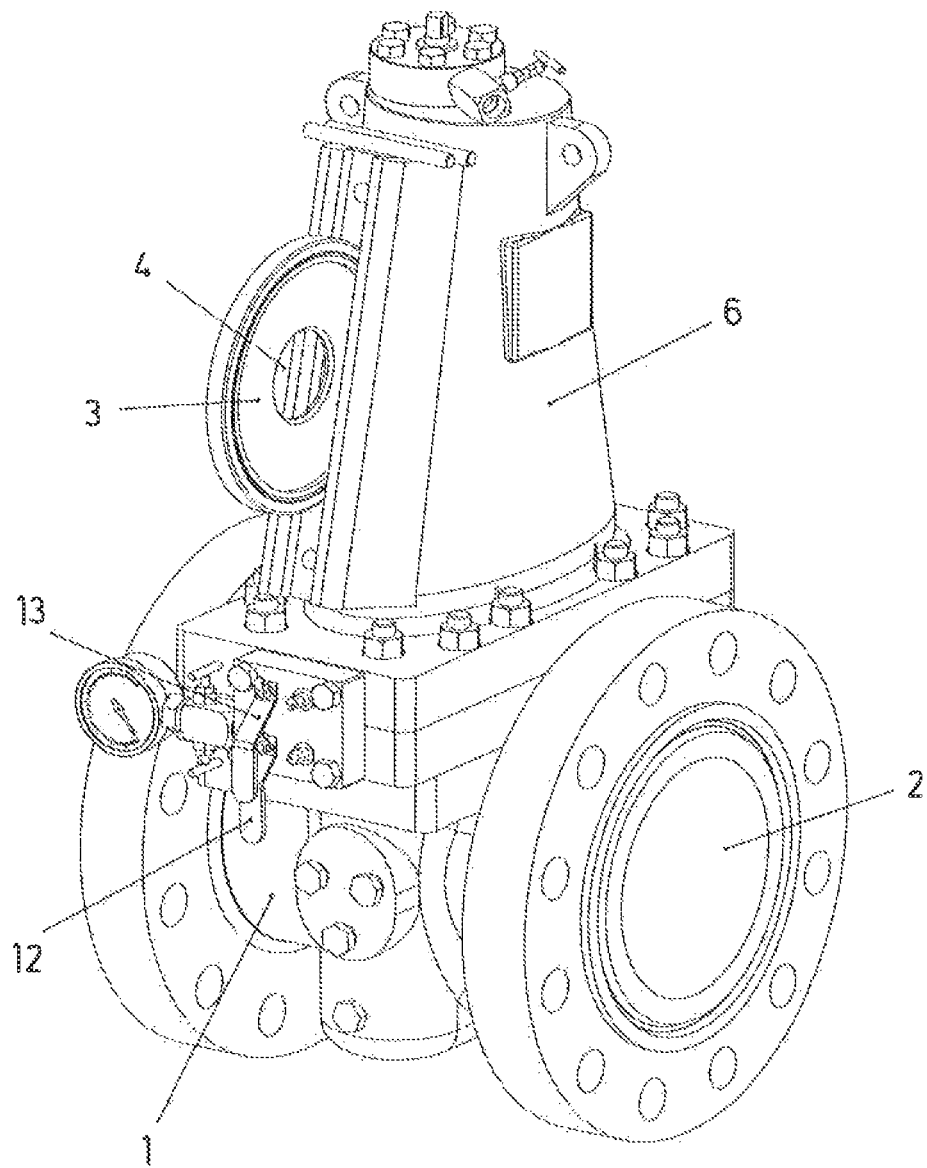
FIG. 2 shows a perspective view of the flow meter with the plate with an orifice in the position for being extracted.

Once this is done, the circulated fluid is prevented from passing to said accessory chamber (6) by closing the communication passage (5) between the axial conduit (2) and the accessory chamber (6), being able to remove the cover (7) to extract the plate (3), as depicted in FIG. 2, such that the plate (3) can be extracted and introduced without having to interrupt the fluid flow through the axial conduit (2).

According to the invention, there is arranged between the main chamber defined by the axial conduit (2) and the accessory chamber (6) a closure formed by two independent closure elements (8 and 9) which are included in respective housings (10 and 11) intersecting the communication passage (5) between the axial conduit (2) and the accessory chamber (6) with the possibility of movement of each of said closure elements (8 and 9) in their respective housings (10 and 11) between a position in which they do not interfere with the aforementioned passage (5) between the axial conduit (2) and the accessory chamber (6) and a position in which they interrupt said passage (5).

Therefore, when the plate (3) is in the accessory chamber (6), the seal of said passage (5) is established by means of the movement of the first closure element (8) in its housing (10) to the position in which it interrupts the passage (5) between the axial conduit (2) and the accessory chamber (6), as depicted in FIG. 5; and a second seal complementary to the seal established by the first closure element (8) is established by means of the movement of the second closure element (9) in its housing (11) to the respective position in which it interrupts the passage (5), which determines a completely leak-tight closure which completely prevents any leak of the fluid circulating through the axial conduit (2) towards the accessory chamber (6).

That leak-tightness provided by the dual closure or this system of the invention between the axial conduit (2) and the accessory chamber (6) allows securely extracting and incorporating the plate (3) of the flow meter without interrupting the fluid circulation, even in applications for high-pressure fluid conduits, or in environments where double isolation is a requirement on Health, and Safety grounds.

The closure elements (8 and 9) of the closure system of the passage (5) communicated with the main chamber defined by the axial conduit (2) and the accessory chamber (6) have respective controls (12 and 13) located on the outside of the flow meter, such that by actuating said controls (12 and 13) the aforementioned closure elements (8 and 9) of the closure system can move between their respective sealed and open positions for sealing and opening the passage (5) when necessary.

The invention claimed is:

1. A double chamber differential pressure meter comprising:
    an axial fluid circulation conduit adapted to allow a flow of a fluid to be measured, the axial fluid circulation conduit comprising a first cross-sectional area;
    a plate adapted to fit in the axial fluid circulation conduit, the plate comprising an orifice having a second cross-sectional area smaller than the first cross-sectional area;
    a chamber coupled to the axial fluid circulation conduit by a communication passage, the chamber being adapted to hold the plate, the communication passage being adapted to allow the plate to move between the axial fluid circulation conduit and the chamber, the chamber further comprising an opening adapted to allow the plate to be removed from the double chamber differential pressure meter;
    first and second closure elements disposed between the axial fluid circulation conduit and the chamber, wherein:
        the first closure element comprises a first housing and a first plate valve disposed in the first housing, the first housing comprising first and second openings defining a first portion of the communication passage, the first plate valve having a first side and a second side opposite the first side, the first plate valve adapted to linearly move from a first position within the first housing in which the first plate valve does not interfere with the communication passage to a second position within the first housing in which the first side of the first plate valve is adjacent to and covers the first opening and the second side of the first plate valve is adjacent to and covers the second opening, thereby interrupting the communication passage; and
        the second closure element comprises a second housing and a second plate valve disposed in the second housing, the second housing comprising third and fourth openings defining a second portion of the communication passage, the second plate valve having a third side and a fourth side opposite the third side, the second plate valve adapted to linearly move from a third position within the second housing in which the second plate valve does not interfere with the communication passage to a fourth position within the second housing in which the third side of the second plate valve is adjacent to and covers the third opening and the fourth side of the second plate valve is adjacent to and covers the fourth opening, thereby interrupting the communication passage.

2. The double chamber differential pressure meter according to claim 1, further comprising first and second controls adapted to actuate movement of with the first and second closure elements, respectively, between respective sealed and open positions for sealing and opening the communication passage.

3. The double chamber differential pressure meter according to claim 1, wherein the movement of the first and second closure elements to respective sealed positions is required to form a leak-tight seal.

4. The double chamber differential pressure meter according to claim 1, wherein:
  the first housing includes a first wall in which the first opening is located and a second wall in which the second opening is located, the first wall being opposite the second wall;
  the first plate valve fills a first volume extending from the first wall to the second wall when the first plate valve is in the first position;
  the first plate valve fills a second volume extending from the first opening to the second opening when the first plate valve is in the second position;
  the second housing includes a third wall in which the third opening is located and a fourth wall in which the fourth opening is located, the third wall being opposite the fourth wall;
  the second plate valve fills a third volume extending from the third wall to the fourth wall when the second plate valve is in the third position; and
  the second plate valve fills a fourth volume extending from the third opening to the fourth opening when the second plate valve is in the fourth position.

* * * * *